United States Patent [19]

Monroe

[11] Patent Number: 4,899,781
[45] Date of Patent: Feb. 13, 1990

[54] TAMPER INDICATOR ASSEMBLY FOR VALVES AND LIKE DEVICES

[75] Inventor: Robert E. Monroe, Kingston, Tenn.

[73] Assignee: Dunn Diversified Industries, Inc., Kingston, Tenn.

[21] Appl. No.: 291,604

[22] Filed: Dec. 29, 1988

[51] Int. Cl.$^4$ .................. F16K 28/08; F16K 27/12
[52] U.S. Cl. ............................... 137/382; 220/85 P; 220/214; 292/321; 292/322
[58] Field of Search .............. 73/431; 116/277, 278; 206/807; 220/85 P, 86 AT, 214; 137/377, 378, 381, 382; 292/317, 319, 321, 322

[56] References Cited

U.S. PATENT DOCUMENTS

| | | | |
|---|---|---|---|
| 2,029,955 | 2/1936 | Taylor | 137/382 |
| 2,201,521 | 5/1940 | Cook | 220/85 P |
| 2,206,707 | 7/1940 | Shaw | 137/382 |
| 2,216,717 | 10/1940 | Alessio | 220/85 P |
| 2,713,872 | 7/1955 | Juengling | 137/382 |
| 3,467,427 | 9/1969 | Moberg | 292/322 |
| 3,696,964 | 10/1972 | Deakin | 137/377 |
| 3,712,655 | 1/1973 | Fuehrer | 292/322 |
| 3,717,369 | 2/1973 | Stoffel et al. | 292/322 |
| 4,248,262 | 2/1981 | Iwanaga | 137/382 |
| 4,380,247 | 4/1983 | Douglas | 137/382 |

FOREIGN PATENT DOCUMENTS

| | | | |
|---|---|---|---|
| 2932101 | 2/1981 | Fed. Rep. of Germany | 137/377 |
| 1421145 | 1/1976 | United Kingdom | 137/382 |
| 1510778 | 5/1978 | United Kingdom | 137/382 |

Primary Examiner—George L. Walton
Attorney, Agent, or Firm—Pitts and Brittian

[57] ABSTRACT

A tamper indicator for placement over valves and other regulating type devices used on storage containers to detect any unlawful operation of the valve or other device. This indicator has a sleeve-like body, closed at one end, for encasing the valve or other device. A locking bar is passed through openings in the body near the open end, this bar positioned so as to engage the base of the valve or other regulating device. One end of the bar has a restriction to prevent passage of that end through the openings, and the other end of the bar is provided with an aperture to receive a seal member. This seal member must be destroyed for removal. A broken seal member thus indicates tampering. By providing a unique indicia on the seal member, any attempt to install another seal member after tampering has occurred can be detected. The device of the present invention is of particular value when used as a tamper indicator on valved containers of uranium hexafluoride or other controlled substances.

17 Claims, 2 Drawing Sheets

TAMPER INDICATOR ASSEMBLY FOR VALVES AND LIKE DEVICES

DESCRIPTION

1. Technical Field

This invention relates generally to security devices, and more particularly to a tamper indicator assembly for placement over valves of containers holding substances of high value, hazardous to the environment or having other characteristics wherein it is desirable to detect tampering of the valves.

2. Background Art

There are numerous industrial products that are stored in various types of valved containers, e.g., valved drums, valved tanks, etc. For example, the oil industry stores many products and intermediate products in valved drums. There are many industrial and potentially hazardous gases stored in pressurized tanks provided with valves for the filling and the discharge of these gases. In addition, the nuclear industry stores uranium hexafluoride and other sensitive materials in various-sized drums which are equipped with valves through which material is placed in the drums, and through which it is withdrawn.

Containers such as these holding various valuable materials are periodically monitored to ascertain the integrity of the valves. For example, in the petroleum industry care must be taken to prevent pirating of the content of storage drums, or the adultering of the contents. Of course, the security of drums containing the uranium hexafluoride and other such sensitive materials is of considerable concern. However, since the integrity of the valves cannot be monitored continuously, there is always a possibility for the tampering of the valves during intervals between inspections. Furthermore, it may not always be possible to determine if tampering has occurred without complete inspection of the content of the drums and/or tanks.

It is therefore an object of the present invention to provide a security device that will indicate if tampering of a valve has occurred.

It is also an object of the present invention to provide a device for enclosing a valve of a storage container to provide hinderance to the tampering of the valve, and to provide an indication when tampering has occurred.

Another object of the present invention is to provide an enclosure for valves of storage containers that permits viewing of the indentification number of the valve as well as providing a visual indication that tampering with the valve has occurred.

A further object of the present invention is to provide a transparent enclosure, with a tamper indicating means, that can be used on storage containers that are stored outdoors.

It is also an object of the present invention to provide a tamper indicator for valves that is easily manufactured at a relatively low cost so as to be an effective unit for large installations of storage containers.

These and other objects of the present invention will become apparent upon a consideration of the drawings herein and a complete description thereof.

DISCLOSURE OF THE INVENTION

In accordance with the present invention, there is provided a generally cup-shaped enclosure for inversion over a valve on a storage container. Preferably, at least a major portion of this enclosure is transparent to permit viewing the integrity of the valve and any identification number affixed thereto. A transfer locking bar passes through the enclosure so as to engage a lower surface of the valve if attempts for removing the enclosure occur. This bar passes through openings in the wall of the enclosure, with one end thereof formed so as to prevent passage through the openings. The opposite end of the bar is provided with an aperture which is exterior to the enclosure to accept a security tag bearing a unique identification indicia.

BEST MODE FOR CARRYING OUT THE INVENTION

Figure 1:
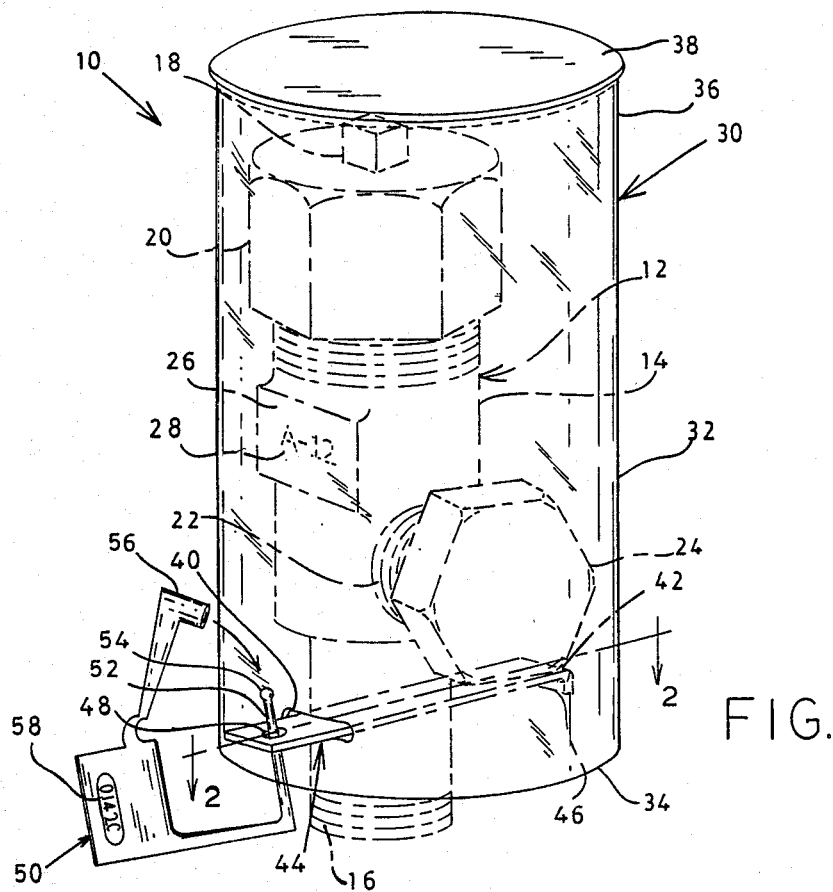
FIG. 1 is an isometric drawing of one embodiment of the present invention illustrating, as with phantom lines, a typical valve used for storage containers.

An isometric view of the present invention is illustrated at 10 in FIG. 1, with a typical valve 12 indicated in phantom lines in order to show how the device 10 provides a tamper indicator for the valve. The valve 12 has a body member 14 which is attached to a typical container (not shown) with a nipple 16 or the like. There is a valve stem 18 and a packing nut 20 of conventional construction, and there is a valve discharge 22. Typically, this discharge 22 is provided with a cap 24 threaded thereon. The valve body member 14 may have a surface 26 upon which identifying indicia 28 can be placed. It will be noted that the body member 14 and the discharge 22 project outwardly a distance from the connecting nipple 16. This forms what is termed hereinafter as the "valve base" which, as discussed below, provides for the effectiveness of the subject tamper indicating device 10.

The device 10 has a housing 30, which in this embodiment is a cylindrical body 32, having an open end 34 toward the container (not shown) and an opposite end 36 closed with end wall 38. These components are shown individually in FIGS. 3–5. This end wall can be sealed to the body 32 or the two components can be integrally formed. The body 32 can have other cross-sectional configurations (e.g., rectangular) if desired with the end wall 38 configured accordingly. Preferably at least the body wall should be substantially transparent so as to view the identification indicia and integrity of the valve. Typically, the body and end wall can be fabricated from polyvinyl chloride since this plastic is relatively resistant to ultraviolet radiation when the unit is to be stored outdoors. Alternatively, the housing components can be fabricated from other relatively indestructible materials. Other usable plastics are polyethylene and butylate, for example.

Figure 2:
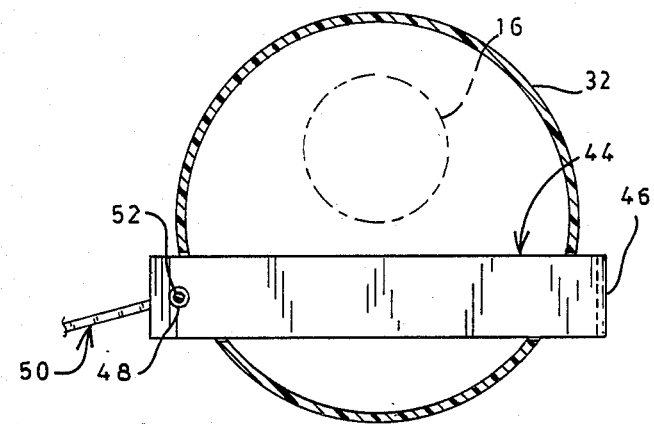
FIG. 2 is a cross-sectional drawing of the embodiment of FIG. 1 taken at 2—2 therein.

As shown, the body 32 is provided with a pair of aligned slots 40, 42 adjacent, but spaced from, the open end 34. Preferably these slots are oriented so that the long axis of each lies in a plane that is transverse to the long axis of the body member 32. The relative position of these slots, which are not on a diameter of the body member 32, is illustrated in FIG. 2. These slots must permit passage of a locking bar 44 past the valve nipple 16, but close thereto whereby the locking bar will contact the aforesaid valve base such that the housing 30 cannot be removed from the valve 12.

This locking bar 44 has a turned over end 46 normally exterior the body 32, and the second end of the locking bar is provided with an aperture 48 normally exterior to the body 32. This aperture is to accept a seal member 50 therethrough. The purpose of this seal member is to identify whether tampering of the valve has occurred. Thus, it is such as to prevent removal from the aperture unless authorized. While many types of seal members will be satisfactory, such as those used on meter bases and the like, the particular seal member illustrated in FIG. 1 is a Spring-Loc seal as manufactured by the E. J. Brooks Co. of Newark, N.J. This has a finger 52 whose distal end 54 is shaped so as to fit through, and lock against removal from, a socket 56. Also, this particular seal member is provided with an indicia 58 that is not duplicated on any other units of this model, i.e., the indicia is "unique". This is preferred for any type of seal member 50 so that a substitute seal member cannot be inserted after tampering has occurred.

Figure 6:
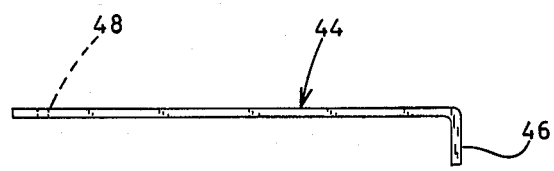
FIG. 6 is an edge view of the locking bar illustrated in the embodiment of FIG. 1.

Although a flat locking bar is illustrated in FIGS. 1 and 6, the locking bar can have other cross-sections including being circular in cross-section. For a locking bar of such configuration, the apertures in the body member would be circular rather than the elongated slots shown in FIGS. 1 and 3.

Figure 3:
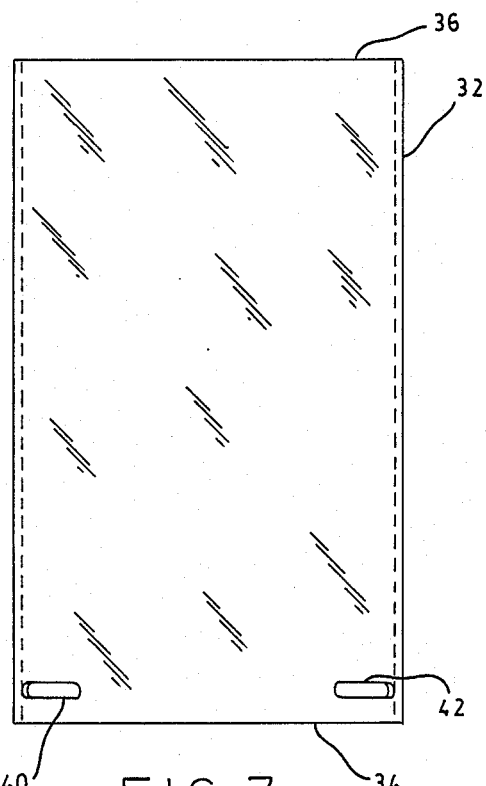
FIG. 3 is a front elevation of a cylindrical portion of the embodiment of FIG. 1.
Figure 4:
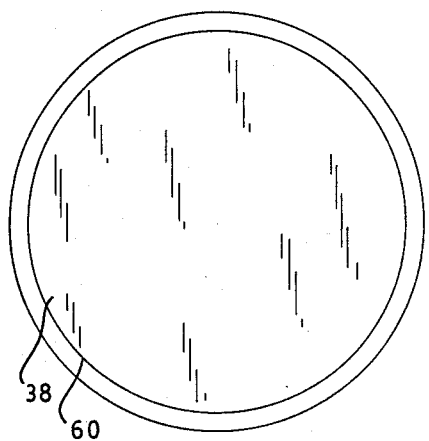
FIG. 4 is a bottom view of an end cap for insertion in the cylinder of FIG. 3 to form the enclosure of FIG. 1.
Figure 5:
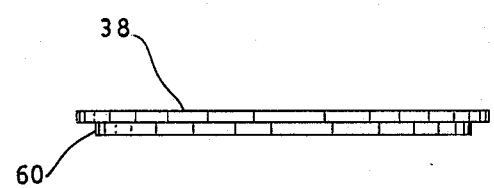
FIG. 5 is an edge view of the end cap of FIG. 4.

The individual components of the present invention, except for the seal member 50, are shown individually in FIGS. 3-6. In FIG. 3 is illustrated the preferred cylindrical form of body member 32. However, as stated above, other configurations can be used as long as it reasonably accommodates the valve 12. Although the open end 34 of the body member 32 is illustrated as being perpendicular to the axis of the body, other angular orientations can be used if desired to conform to the angular relationship of the valve to the container or the contour of the container surface. The end wall 38 for securely joining to the body member 32 is shown from the lower surface and from an edge in FIGS. 4-5, respectfully. This is formed so that a smaller diameter 60 will fit within the end 36 of the cylindrical body 32. These components are typically joined by a cement commensurate with the materials of construction so as to prevent subsequent separation of the components. The choice of cement will be known to those versed in the art of plastics. Although the end wall 38 is illustrated as being flat, other configurations (such as a domed-shape) can be used for either the integral or joined constructions. While it is preferred that the body member is transparent, this requirement is not necessary for the end wall. Of course, if a molded enclosure unit is used, the entire enclosure would preferably be transparent.

The preferred form of the locking bar 44 is illustrated in FIG. 6. It can be seen that the turned down end 46 is substantially perpendicular to the length of the locking bar and is of sufficient length to prevent passage through the slots 40, 42 of the body member 32. Of course, other means can be provided at the end to prevent such passage through the slots.

In a normal utilization of the present invention, the enclosure 30 is first placed over the valve 12. Thereafter the apertured end of the locking bar 44 is inserted through both slots 40, 42 until the turned down end 46 is proximate the exterior surface of the body member 32. This places the aperture 48 also on the outside of the body member to accept the seal member 50. In this position, the locking bar is beneath the valve base such that the enclosure 30 cannot be removed from the valve. Since the indicia on the seal member is unique, and can be recorded, the seal member can be inspected periodically to determine if tampering has occurred.

From the foregoing, it will be understood by those versed in the art that a device has been developed and described herein that will indicate whether a valve or similar flow regulating device has been tampered. While not intended to be a primary physical security device, it provides some protection of the valve, etc., against damage during movement of the container, or from activities in the proximity of the valve. While certain features of the invention have been identified as being preferable, there is no intent to limit the invention by such identification. Rather, the invention is to be limited only by the appended claims and their equivalents when read together with the description thereof.

I claim:

1. A device for providing an indication of tampering with a valve having a valve base which comprises:
   an unperforated hollow enclosure for completely surrounding and said valve, said enclosure having an open end to receive said valve and a closed end to prevent access to said valve, said enclosure provided with aligned openings proximate said open end;
   a locking bar for passing through said aligned openings proximate said valve base for engaging a portion of said valve to prevent removing said enclosure from said valve, said locking bar having a first end having means disposed through one of said aligned openings to prevent said first end from passing through said one of said aligned openings, said locking bar having a second end provided with an aperture extending exterior to a second of said aligned openings; and
   a seal member for passing through said aperture in said locking bar, said seal member requiring destruction thereof if removed from said aperture to thereby indicate tampering with said valve.

2. The device of claim 1 wherein said hollow enclosure is an impact resistant plastic selected from polyethylene, butylate and polyvinyl chloride.

3. The device of claim 2 wherein said hollow enclosure is polyvinyl chloride.

4. The device of claim 3 wherein at least a major portion of said hollow-enclosure is substantially transparent.

5. The device of claim 3 wherein said enclosure is integrally formed.

6. The device of claim 1 wherein said enclosure is substantially cylindrical.

7. The device of claim 5 wherein said enclosure has a cylindrical wall member and an end member joined to said wall member to form said closed end of said enclosure.

8. The device of claim 1 wherein said aligned openings in said enclosure are elongated slots, and wherein said locking bar is a flat metallic body having a substantially perpendicularly oriented first end as said means to prevent said first end from passing through said aligned openings.

9. A device for providing an indication of tampering with a valve having a valve base, which comprises:
- an unperforated hollow cylindrical enclosure completely surrounding and enclosing said valve, said enclosure having an open end to receive said valve and a closed end to prevent access to said valve, said enclosure provided with aligned elongated slots proximate said open end;
- a flat locking bar for passing through said aligned slots proximate said valve base for engaging a portion of said valve to prevent removal of said enclosure from said valve, said locking bar having a first end portion and a body portion disposed through one of said aligned openings, said first end portion oriented substantially perpendicular to said body portion to prevent said first end from passing through said one of said aligned slots, said locking bar provided with an aperture proximate a second end extending exterior to a second of said aligned openings; and
- a seal member for passing through said aperture in said locking bar when said locking bar is passed through said aligned slots to prevent removal of said locking bar, said seal member requiring destruction thereof if removed from said aperture to thereby indicate tampering with said valve.

10. The device of -claim 9 wherein said enclosure is a cylindrical wall member provided with an end cap securely joined to said wall member to form said closed end.

11. The device of claim 10 wherein both said wall member and said end cap are polyvinyl chloride members cemented to each other.

12. The device of claim 11 wherein at least said wall member is transparent.

13. The device of claim 10 wherein said wall member and said end cap are integrally formed.

14. The device of claim 9 wherein said locking bar is steel.

15. A device for providing an indication of tampering with a valve having a valve base, which comprises:
- an unperforated hollow cylindrical polyvinyl chloride enclosure formed from a cylindrical wall member and a polyvinyl chloride end wall cemented to said wall member whereby said enclosure has an open end to accept said valve and a closed end to prevent access to said valve, said wall member provided with aligned elongated slots proximate said open end of said enclosure;
- a flat steel locking bar for passing through said elongated slots proximate said valve base for engaging a portion of said valve to prevent removal of said enclosure from said valve, said locking bar having a first end portion and a body portion disposed through one of said aligned openings, said first end portion oriented substantially perpendicular to said body portion to prevent said first end from passing through said one of said aligned slots, said locking bar provided with an aperture proximate a second end extending exterior to a second of said aligned openings; and
- a seal member for passing through said aperture in said locking bar when said locking bar is passed through said aligned slots to prevent removal of said locking bar, said seal member requiring destruction thereof if removed from said aperture to thereby indicate tampering with said valve.

16. The device of claim 15 wherein at least said wall member of said enclosure is transparent.

17. The device of claim 15 wherein said seal member is provided with a non-duplicated indicia thereon to prevent unauthorized substitution of a seal member after tampering with said valve has occurred.

* * * * *